United States Patent Office 3,297,532
Patented Jan. 10, 1967

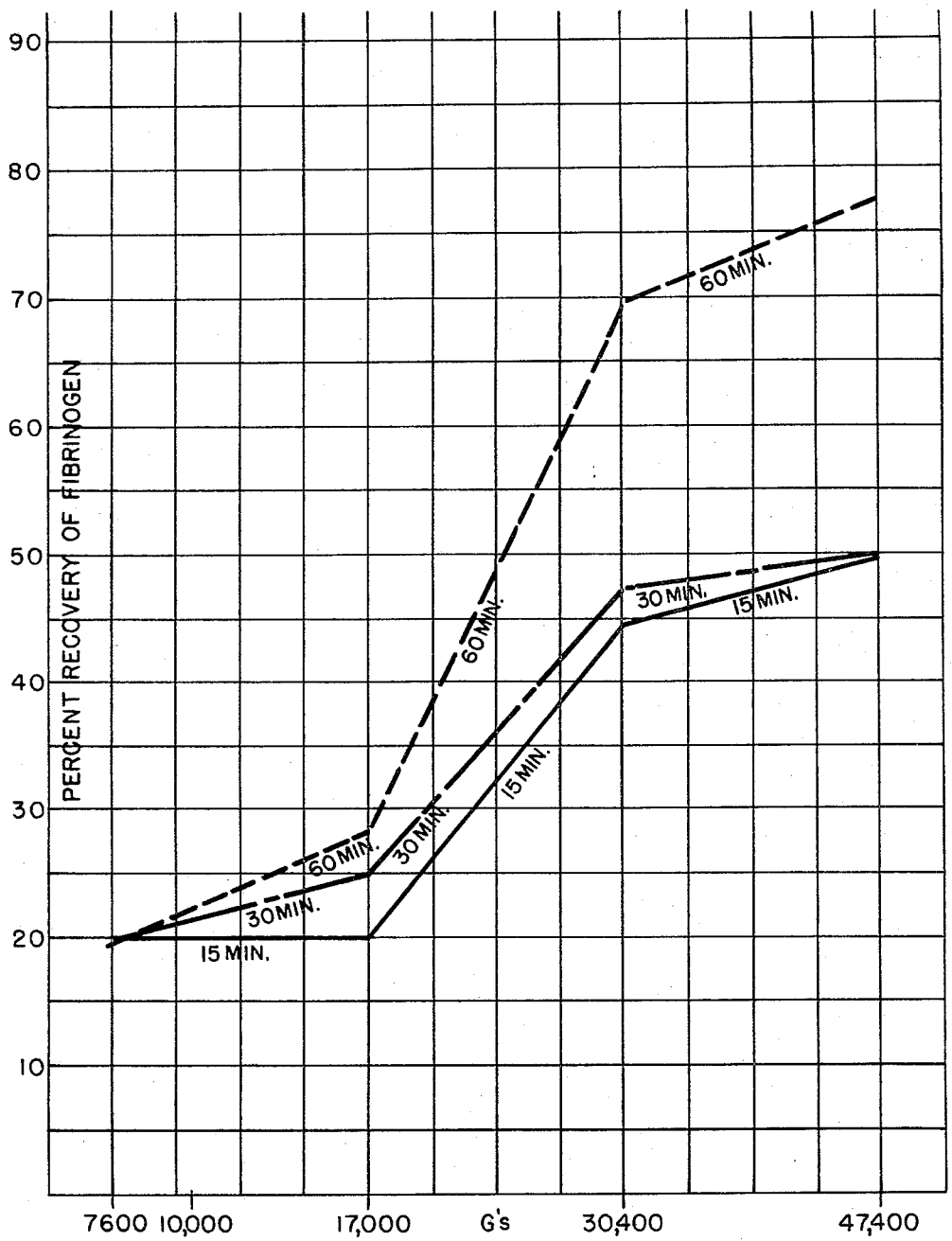

3,297,532
CENTRIFUGATION METHOD
Alan R. Jones, Miami, Fla., assignor to International Equipment Company, Boston, Mass., a corporation of Massachusetts
Filed Apr. 19, 1962, Ser. No. 188,643
8 Claims. (Cl. 167—74)

The present invention relates to methods of centrifugation when the liquid contains particles of colloidal or molecular dimensions whose separation is desired.

The application of centrifugal fields for the separation of solid particles from suspension in a liquid or the separation of one liquid from another is well known. Such separations require that the phases to be separated possess differing specific gravities. The less the difference in specific gravity between the phases, the greater the centrifugal field required to produce separation within a given duration of application of the centrifugal field.

In accordance with the invention, centrifugation, where the discontinuous phase is characterized by particle dimensions within the colloidal range or smaller and whether or not the discontinuous phase is polydisperse, is effected by first freezing the liquid and then placing the frozen body in a centrifugal field and maintaining the body frozen during the resulting separation.

More specifically, the invention relates to the application of centrifugal fields which may be of moderate value (the approximate range of from $10,000 \times G$. to $50,000 \times G$., for example) to the mixture to be separated while maintaining it in a solid frozen state. By freezing liquids to the solid state, particularly when temperatures lower than minus 10° C. are used, thermal convection currents are eliminated and the range of movement permitted to individual molecules through their thermal kinetic energy is stringently limited by the solid nature of the surrounding ice. The thermal kinetic energy of molecules in a medium of solid ice is thus expressed more by an oscillatory movement about a fixed point rather than a random migration such as occurs in liquids. There thus remains, as a restoring force, the force which binds the molecule into the ice matrix. The exact nature of this force and the way in which molecules of various sorts are incorporated into the intimate structure of the ice have been the subject of scientific hypothesis, but there exists little knowledge on these points.

Separation is effective because, in addition to the fact that the effect of the restoring forces is reduced and held to a minimum by freezing, there is established an interfelted crystalline structure in which the particles are held in a distributed state and which provides a multiplicity of passages. Such passages are more or less tortuous and are, when the liquid is subjected to normal quick freezing techniques, of colloidal or molecular dimensions at least to a substantial extent. They thus define passageways along which appropriately dimensioned particles may be moved by the effect of the centrifugal field thereon while excluding larger particles. The passages may be made smaller in size by subjecting the liquid to faster freezing methods but, in any event, they have the effect of physically separating the discontinuous phase into a multiplicity of portions, each inclusive of a passageway.

I have found that the application of moderate centrifugal fields to certain solutions maintained in the solid frozen state produces significant and useful separation of the various phases of polydisperse solutions (including colloidal solutions) at a molecular level. In particular, this invention has been applied to the separation of various protein components of human plasma or serum. The application of the invention to the separation of human plasma components will be taken as illustrative of the general techniques and conditions of the invention, it being recognized that the use of this example does not imply restriction of the invention to this field.

Human plasma is separated from whole blood by conventional methods such as described in the Manual of Technical Procedures of the American Association of Blood Banks. By way of example, the plasma is then placed in containers which in turn are fitted into the detachable head of the centrifuge. The head, together with the containers of plasma, is now placed in a freezer capable of cooling the unit to at least minus 20° C. and it is retained therein until the plasma has reached the lowest temperature achieved by the freezer. The plasma will of course, now be frozen solid.

The head is now attached to the drive-shaft of the centrifuge and the centrifuge motor is started. The centrifuge must be of a type which provides refrigeration to the head, either by cooling coils, Dry Ice or other means. The temperature of air in the immediate vicinity of the rotating head must be no higher than minus 5° C. and preferably lower than this. The object of providing a low ambient temperature for the rotating head is to prevent the frozen plasma from melting during centrifugation.

The strength of the centrifugal field and the duration of the application of the field are determined by the degree of separation of the plasma components desired as well as by the nature of the protein which is being separated. When dealing with molecular phenomena such as occurs during the separation of proteins described here, it is obviously not possible to extend too far the analogy of separation of components on the basis of specific gravity differences. However, experience of this method shows that there exists an approximate proportionality between the molecular weight of the separated component and the product of relative centrifugal force and its duration.

Continuing with the example of human plasma, reference is made to the single figure of the accompanying drawing showing graphically the relationship between the centrifugal field strength and its duration necessary to produce various degrees of separation of one the high molecular weight components of plasma, namely, fibrinogen. By way of illustration, the results at different intervals, 15 minutes, 30 minutes, and 60 minutes, with different centrifugal field strengths, are compared, the centrifugal fields being in the approximate range of from $10,000 \times$ gravity to $50,000 \times$ gravity and readily obtainable with commercially obtainable centrifuges. By way of contrast, centrifugation of liquid plasma, held at a temperature of plus 1° C., for one hour at $47,400 \times$ gravity does not produce any detectable deposit of fibrinogen.

After completion of the centrifuging process the containers of frozen plasma are removed from the centrifuge head and allowed to thaw. Visual inspection of the frozen or thawed plasma shows clearly the existence of a gradation of coloration and optical refractive index, increasing in strength from the top of the container to the bottom. During thawing, care must be taken to avoid undue disturbance of this gradation by convection currents or currents generated by movement of the container. After thawing is complete, the plasma may be aspirated into other containers by drawing aliquots at arbitrary levels from the original containers. Analysis of these aliquots shows progressively increasing protein concentration from above downwards, the composition of the upper aliquots being principally albumin, the middle aliquots being globulin while the lowest aliquots contain most of the fibrinogen. Fibrinogen, particularly if fresh plasma is used, is actually deposited as a gelatinous mass from which the supernatant plasma can be readily and completely separated. The gelatinous fibrinogen deposit is soluble in physiologic saline and represents about 90% of the total fibrinogen originally present in the plasma. Using measurement of antibody content to characterize the globulins, it has been shown that at least a tenfold concentration of antibody globulin may be achieved by proper selection of aliquots from the thawed material.

Methods other than simple thawing and aspiration of aliquots may be used to separate the various layers produced by centrifugation of the frozen material. Typical of such alternatives would be the slicing of the frozen material and thawing the sections so produced.

From the foregoing, it will be appreciated that the centrifugation of frozen liquid bodies effectively overcomes troublesome separation problems when the liquid contains particles of colloidal dimensions or smaller.

I claim:
1. In a centrifuge-separation method for liquid suspensions containing a discontinuous phase whose dimensions do not exceed colloidal dimensions, the steps of freezing the said liquid suspension, and centrifuging the frozen suspension while maintaining the liquid suspension in a frozen state and thereby causing separation of the discontinuous phase of said frozen liquid suspension.
2. The method of claim 1 in which the value of the centrifugal field in which the frozen suspension is centrifuged is at least $10,000 \times G$.
3. The method of claim 1 in which the suspension is plasma and the discontinuous phase is fibrinogen.
4. The method of claim 3 in which the value of the centrifugal field in which the plasma is centrifuged is at least $10,000 \times G$.
5. The method of claim 3 in which the temperature at which the plasma is frozen is at least $-10°$ C.
6. The method of claim 3 in which the temperature at which the plasma is maintained during centrifugation is at least $-5°$ C.
7. The method of claim 3 in which the temperature at which the plasma is frozen is at least $-10°$ C. and the value of the centrifugal field in which the plasma is centrifuged is at least $10,000 \times G$.
8. The method of claim 3 in which the value of the centrifugal field in which the plasma is centrifuged is at least $17,000 \times G$.

References Cited by the Examiner

UNITED STATES PATENTS

| 2,862,824 | 12/1958 | Wenselberger | 99—205 |
| 3,009,388 | 11/1961 | Polanyi | 167—84.5 |

OTHER REFERENCES

Nance: J. Pharmacy and Pharmacology, vol. 2, May 1950, pp. 273–285, especially page 274.

Science, vol. 133, Jan. 20, 1961, pages 193–194.

Ware: Arch. of Biochemistry (Reprint), vol. 13, No. 2, May 1947, pages 231–233.

JULIAN S. LEVITT, *Primary Examiner.*

FRANK CACCIAPAGLIA, JR., *Examiner.*

E. FRANK, A. P. FAGELSON, S. ROSEN,
*Assistant Examiners.*